United States Patent
Calamita (10) Patent No.: US 10,594,887 B1
(45) Date of Patent: Mar. 17, 2020

(54) METHOD FOR MEASURING BEAM TO BEAM STITCH ERROR IN THE PRESENCE OF VARIABLE WIDTH BEAMS

(71) Applicant: Xerox Corporation, Norwalk, CT (US)

(72) Inventor: James P. Calamita, Spencerport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/356,632

(22) Filed: Mar. 18, 2019

(51) Int. Cl.
- H04N 1/06 (2006.01)
- H04N 1/04 (2006.01)
- H04N 1/10 (2006.01)
- H04N 1/113 (2006.01)

(52) U.S. Cl.
CPC ......... *H04N 1/0635* (2013.01); *H04N 1/0423* (2013.01); *H04N 1/0435* (2013.01); *H04N 1/1056* (2013.01); *H04N 1/1135* (2013.01)

(58) Field of Classification Search
CPC .... G02B 26/0833; G02B 13/08; G02B 13/24; G02B 26/0816; G02B 26/0841; G02B 26/106; G02B 27/0911; G02B 27/0966; G02B 27/0983; G02B 27/1046; G02B 27/106; G02B 27/126; G02B 27/143; B41L 17/08; B41M 1/06; G03F 7/70275; G03F 7/70291; G03F 7/70366; G03F 7/70475; G03G 15/04045; G03G 15/0435; H04N 1/00891; H04N 1/00978; H04N 1/02825; H04N 1/0288; H04N 1/02895; H04N 1/03; H04N 1/047; H04N 1/06; H04N 1/1215; H04N 1/1903; H04N 1/195; H04N 1/19584; H04N 1/19589; H04N 2201/04765; H04N 2201/04789; H04N 2201/04791

USPC .............. 359/290, 292, 668, 291, 298, 649; 347/258, 239, 244, 224, 248, 255, 259; 355/67, 53; 358/474, 475, 1.15
See application file for complete search history.

(56) References Cited

U.S. PATENT DOCUMENTS

| | | | |
|---|---|---|---|
| 6,076,915 A | 6/2000 | Gast et al. | |
| 6,747,684 B2 | 6/2004 | Ornellas et al. | |
| 7,290,872 B2 * | 11/2007 | Calamita | B41J 2/175 347/88 |
| 8,200,131 B2 * | 6/2012 | Calamita | B41J 2/473 399/281 |
| 8,451,518 B2 * | 5/2013 | Calamita | G03G 15/0178 358/1.9 |
| 8,562,101 B2 * | 10/2013 | Calamita | B41J 3/543 347/14 |
| 8,643,405 B2 * | 2/2014 | Moore | H03K 5/01 326/82 |

(Continued)

*Primary Examiner* — Negussie Worku
(74) *Attorney, Agent, or Firm* — Caesar Rivise, PC (57) ABSTRACT

According to aspects of the embodiments, there is provided process and architecture for enabling multiple digital micromirror devices (DMDs) that include optical modulation elements configured to modulate light outputting from a light source, and a projection unit configured to project light modulated by the optical modulation elements on a printing plate. Image defects due to misalignment in the cross-process direction of the output from the DMDs are discovered by using a single test pattern image and combined with knowledge of how individual pixels are rendered to register printing elements which can render a variable number of pixels. Misalignment errors can be corrected by selecting a different set of mirrors for a given DMD.

20 Claims, 7 Drawing Sheets

(56) References Cited

U.S. PATENT DOCUMENTS

| | | | |
|---|---|---|---|
| 8,670,172 B2 | 3/2014 | Stowe et al. | |
| 8,791,972 B2 | 7/2014 | Hoover et al. | |
| 8,798,510 B2 * | 8/2014 | Calamita | G03G 15/01 347/116 |
| 8,805,252 B2 * | 8/2014 | Calamita | G03G 15/55 399/301 |
| 9,375,962 B1 * | 6/2016 | Donaldson | B41J 29/393 |
| 2006/0221124 A1 | 10/2006 | Guarino et al. | |
| 2010/0290692 A1 * | 11/2010 | Macaulay | G06T 7/0012 382/133 |
| 2013/0050391 A1 * | 2/2013 | Maeda | B41J 2/465 347/259 |
| 2013/0050669 A1 * | 2/2013 | Maeda | B41J 2/465 355/67 |
| 2013/0050778 A1 * | 2/2013 | Stowe | G02B 27/1046 358/475 |
| 2013/0050799 A1 * | 2/2013 | Stowe | B41J 2/465 359/290 |
| 2013/0050803 A1 * | 2/2013 | Stowe | G03F 7/70275 359/292 |
| 2013/0050842 A1 * | 2/2013 | Maeda | B41J 2/465 359/668 |
| 2013/0208304 A1 * | 8/2013 | Hoover | B41L 17/08 358/1.15 |
| 2014/0125860 A1 * | 5/2014 | Tofsted | G06T 5/001 348/349 |

* cited by examiner

METHOD FOR MEASURING BEAM TO BEAM STITCH ERROR IN THE PRESENCE OF VARIABLE WIDTH BEAMS

BACKGROUND OF THE INVENTION

This invention relates to digital offset printer systems, and in particular to color printers having single-pass imaging systems that utilize multiple DMD (Digital Micro-mirror Device) devices for high speed image transfer operations.

In Variable Data Lithography (also referred to as Digital Lithography or Digital Offset) printing process begins with a fountain solution used to dampen a silicone imaging plate on an imaging drum. The fountain solution forms a film on the silicone plate that is on the order of about one (1) micron thick. The drum rotates to an exposure station where a high power laser imager is used to remove the fountain solution at the locations where the image pixels are to be formed. This forms a fountain solution based latent image. The drum then further rotates to a development station where lithographic-like ink is brought into contact with the fountain solution based latent image and ink develops onto the places where the laser has removed the fountain solution. The ink is hydrophobic. An ultra violet (UV) light may be applied so that photo-initiators in the ink may partially cure the ink to prepare it for high efficiency transfer to a print media such as paper. The drum then rotates to a transfer station where the ink is transferred to a printing media such as paper. The silicone plate is compliant, so an offset blanket is not used to aid transfer. UV light may be applied to the paper with ink to fully cure the ink on the paper. The ink is on the order of one (1) micron pile height on the paper.

The formation of the image on the printing plate is done with imaging modules each using a linear output high power infrared (IR) laser to illuminate a digital light projector (DLP) multi-mirror array, also referred to as the "DMD" ("Digital Micro-mirror Device" or "Digital Micromirror Device") to guide a beam onto the surface of the printing plate. The mirror array is similar to what is commonly used in computer projectors and some televisions. The laser provides constant illumination to the micro-mirror array. The mirror array deflects individual mirrors to form the pixels on the image plane to pixel-wise evaporate the fountain solution on the silicone plate. If a pixel is not to be turned on, the mirrors for that pixel deflect such that the laser illumination for that pixel does not hit the silicone surface, but goes into a chilled light dump heat sink.

Multiple DMDs have been used in the formation of the image on the printing plate for various reasons such as to increase the brightness of the projected image, to enlarge the projected image, to reduce the duty cycle and thus reducing the potential for overheating for each DMD, and to increase the refresh rate of slower DMDs because each would only be responsible for a segment of the projected image. In order to form a cohesive image on the printing plate the use of mosaicking or stitching techniques are used to cover the entirety of the desired imaged area. However, because of thermal changes, manufacturing defects, shifts of DMDs during installation, and the like, there can develop alignment issues that can impact image quality after fitting into a machine. Thus when using multiple DMDs to form an image on the printing plate, there is a need in the art for compensation or alignment correction of beams to create a stitched image.

BRIEF SUMMARY OF THE INVENTION

According to aspects of the embodiments, there is provided process and architecture for enabling multiple digital micromirror devices (DMDs) that include optical modulation elements configured to modulate light outputting from a light source, and a projection unit configured to project light modulated by the optical modulation elements on a printing plate. Image defects due to misalignment in the cross process direction of the output from the DMDs are discovered by using a single test pattern image and combined with knowledge of how individual pixels are rendered to register printing elements which can render a variable number of pixels. Misalignment errors can be corrected by selecting a different set of mirrors for a given DMD.

DETAILED DESCRIPTION OF THE INVENTION

Aspects of the embodiments disclosed herein relate to methods for using a single test pattern, combined with knowledge of how the individual pixels are rendered (by which head/element) to register printing elements which render a variable number of pixels. Benefits include the ability to register an image (in process and cross-process directions) using DLM printing elements (heads or beam paths) like digital micromirror devices with a variable number of active pixels.

Exemplary embodiments are intended to cover all alternatives, modifications, and equivalents as may be included within the spirit and scope of the composition, apparatus and systems as described herein.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof. In the drawing, like reference numerals are used throughout to designate similar or identical elements.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

The terms "print substrate" or "substrate" generally refers to a usually flexible, sometimes curled, physical sheet of paper, Mylar material, plastic, or other suitable physical substrate for images, whether precut or web fed.

As used herein, the term "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASIC s), and field-programmable gate arrays (FPGAs).

As used herein, the term "dash" refers to a mark formed on an image receiving member that includes a series of ink placements extending in the process direction formed by a printer. A dash can be formed from ink located in adjacent pixels in the process direction on the image receiving member and can include a pattern of on/off adjacent pixels in the process direction. As used herein, the term "pixel" refers to a location on the image receiving member that receives a predetermined amount of optical energy. Locations on the image receiving member can be identified with a grid-like pattern of pixels extending in the process direction (usually longitudinal) and cross-process direction (usually Latitudinal) on the image receiving member. As used herein, the term "test pattern" refers to a predetermined arrangement of dashes formed on an image receiving member (media, drum, or plate) by one or more optical device such as a DMD or printheads of a printer. In some embodiments, a test pattern includes a predetermined arrangement of a plurality of dashes formed by some or all of the optical devices or printheads arranged in the print zone.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

In one aspect, a method for registering printing elements which render a variable number of pixels, the method comprising loading instructions to a processor for stitching parallel light beams from the printing elements into a single image that can be formed as a series of marks on an imaging member; wherein the parallel light beams are directed by at least two digital micro mirror devices (DMDs) each comprising a plurality of mirrors such that the parallel light beams are reflected out onto the imaging member; loading a test pattern image to be rendered as the series of marks on the imaging member; using a table that has been modified based on the loaded instructions to determine which of the plurality of mirrors is to produce the series of marks; using the table to render the test pattern image on the imaging member; analyzing the rendered image to determine if a stitch error will occur; if a stitch error is determined, then modifying the table or the instructions to the processor to correct for the stitch error.

In another aspect, wherein the table comprises a storage structure containing pixel identification, micro mirror identification for each micro mirror of a DMD associated with the identified pixel, and parallel light beam state associated with the identified pixel; wherein the parallel light beam state is ON or OFF.

In yet another aspect, wherein the table is modified by: using the loaded instructions to determine parallel beam state for all micro mirrors of the DMDs; and populating the table with the determined parallel beam state for all micro mirrors of the DMDs.

In still another aspect, wherein the table is modified by: removing from the table all micro mirror entries associated with a determined parallel beam state of OFF.

In yet another aspect, wherein the table is modified by: reordering the pixel identification to go from 1 to N, where N is the number of micro mirrors being used.

In a further aspect, the method further comprising identifying in image data of the imaging member an area in which the test pattern has been rendered, the test pattern having dashes formed with different colors denoting dashes printed by different DMDs; identifying a center of each dash in a cross-process direction; identifying from the table a DMD that formed each dash in the test pattern; identifying a DMD expected to form a dash in the test pattern that failed to form the dash; modifying the table or the instructions to the processor to change the micro mirrors used for the DMD that failed to form the dash.

In yet a further aspect, an image formation apparatus, comprising a member defining an imaging surface (rotatable drum); at least two digital micro mirror devices (DMDs), each disposed over a surface of the drum at different angular positions, so as to project a beam onto the surface of the drum from different angles; a processor; and a storage device coupled to the processor, wherein the storage device contains instructions operative on the processor to register projected variable number of pixels from the DMDs by using the table to render the test pattern image on the imaging member; analyzing the rendered image to determine if a stitch error will occur and if a stitch error is determined, then modifying the table or the instructions to the processor to correct for the stitch error.

In still yet a further aspect, a non-transitory computer-readable medium having stored thereon computer executable instructions that, when executed on a processing device, cause the processing device to perform the method for registering printing elements which render a variable number of pixels.

Figure 1:
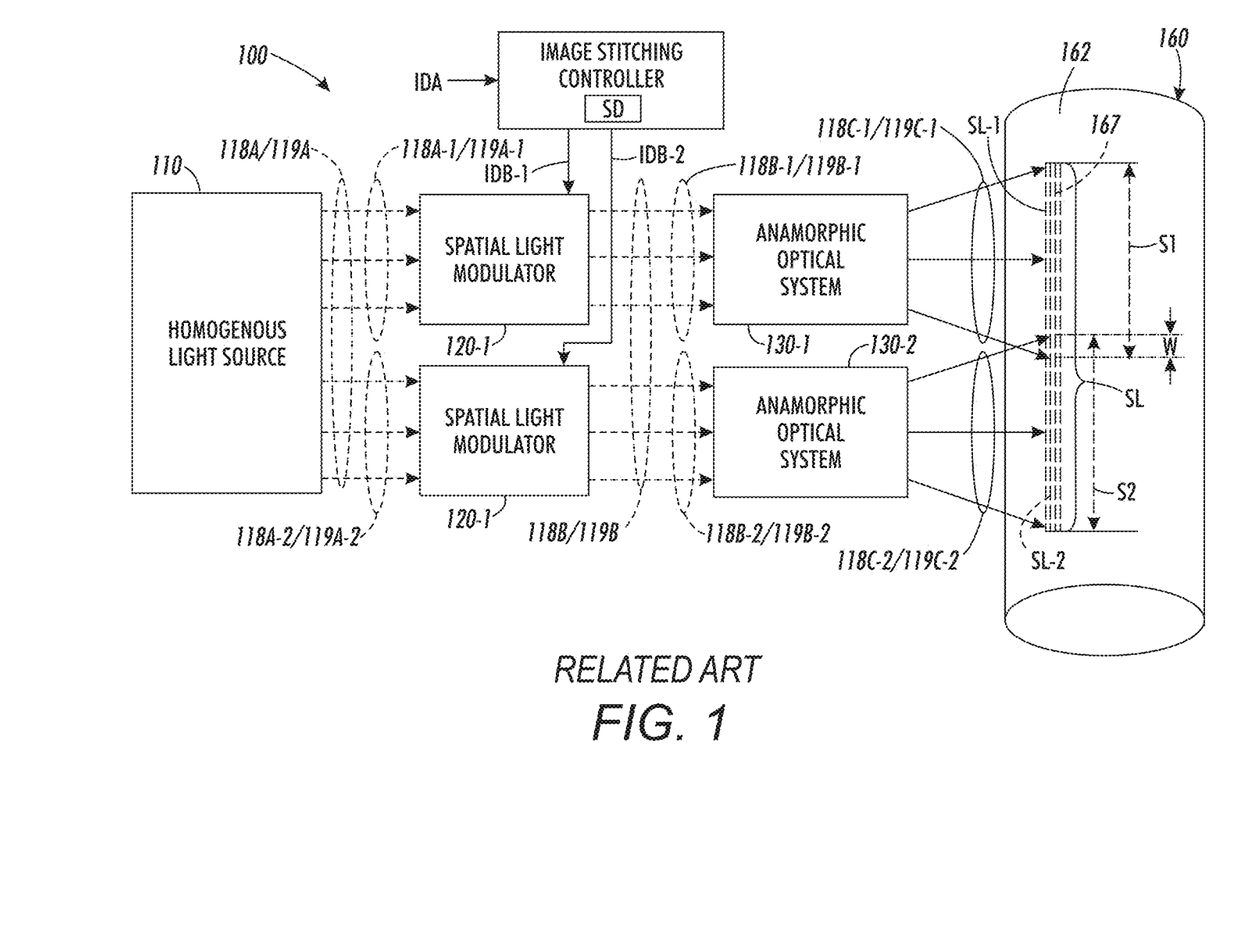
FIG. 1 is a modified block diagram depicting a generalized imaging apparatus including two or more spatial light modulators according to an exemplary embodiment of the present invention.
Figure 2:
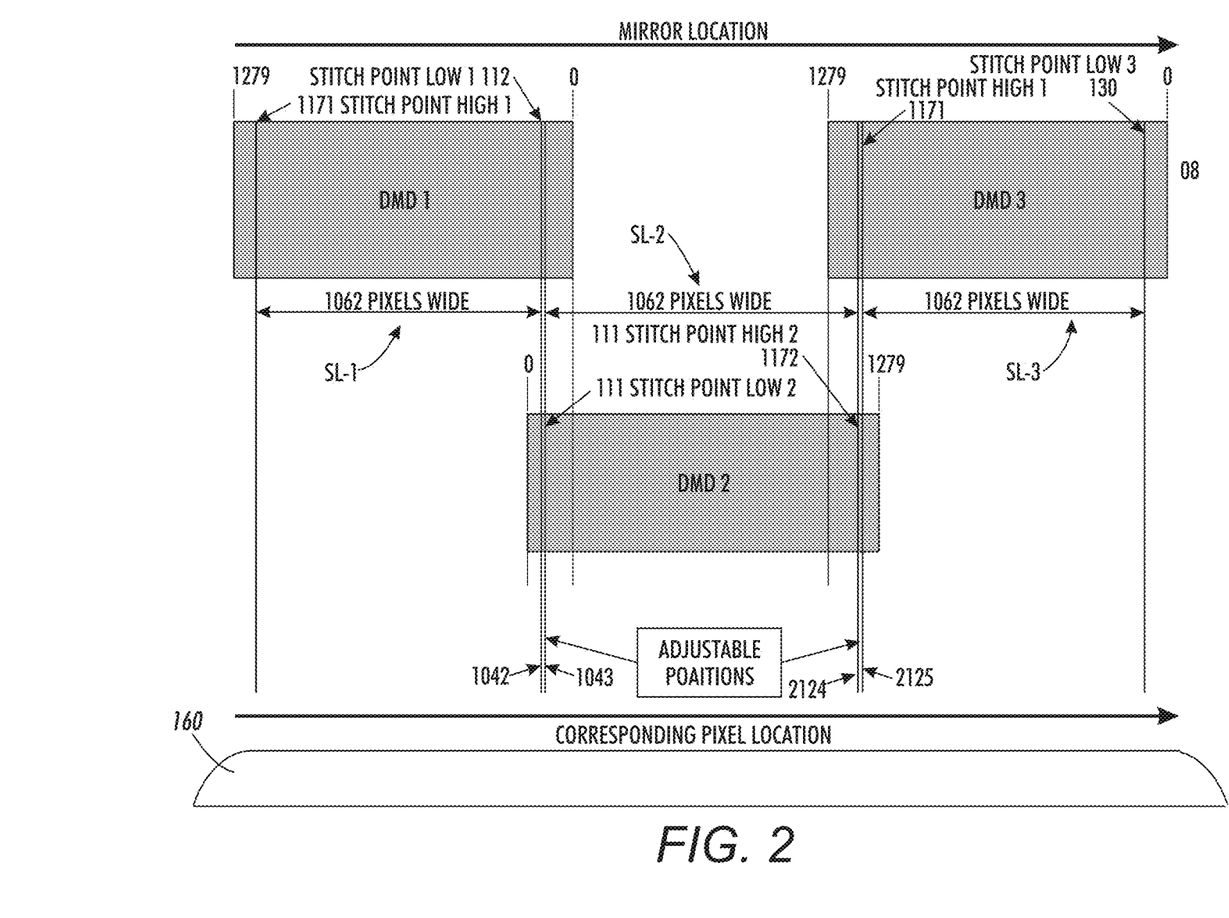
FIG. 2 is a representation showing the cross-process positioning of the DMDs to form a stitched image on a printing plate in accordance to an embodiment.

FIG. 1 is a perspective view showing a single-pass imaging apparatus 100 according to a simplified exemplary embodiment of the present invention, and FIG. 2 is a perspective view showing pixel and mirror assignment for causing an image to be projected onto the imaging member.

Referring to FIG. 1, imaging apparatus 100 generally includes a homogenous light generator 110, at least two spatial light modulators 120-1 and 120-2, at least two anamorphic optical (e.g., projection lens) system 130-1 and 130-2, imaging member 160 such a drum, plate, or scan structure such as upon which a scan line image SL is generated in response to "raw" image data (IDA) or print job, and an image stitching controller 170 that serves to modify the received image data IDA in accordance with predetermined stitching data (SD), and to produce modified image data groups IDB-1 and IDB-2 that are respectively transmitted to spatial light modulators 120-1 and 120-2, whereby spatial light modulators 120-1 and 120-2 are cooperatively controlled such that a seamless scan line image SL is generated in an elongated imaging region 167 of imaging member 160. Although the present invention is described below with reference to two or three associated pairs of spatial light modulators and anamorphic optical systems, imaging apparatus produced in accordance with the present invention may include any number of such pairs utilizing the characteristics described below. In addition, anamorphic optical systems 130-1 and 130-2 are represented for the purposes of simplification in FIG. 1 by single generalized anamorphic projection lens. In practice anamorphic systems 130-1 and 130-2 are typically each composed of multiple separate cylindrical or acylindrical lenses. Further a suitable spatial light modulator can be purchased commercially and would typically have two-dimensional (2D) array sizes of 1024 by 768 (SVGA resolution) or higher resolution with light modulation element (pixel) spacing on the order of 5-20 microns. For purposes of illustration, only a small subset of light modulation elements are depicted in the figures discussed herein.

Referring to the left side of FIG. 1 homogenous light generator 110 serves to generate continuous (i.e., constant/non-modulated) homogenous light 118A that forms a substantially uniform two-dimensional homogenous light field 119A. That is, homogenous light generator 110 is formed such that all portions of homogenous light field 119A, which is depicted by the projected dotted rectangular box (i.e., homogenous light field 119A does not form a structure), receive light energy having substantially the same constant energy level (i.e., substantially the same flux density). For descriptive purposes, light that directed from homogenous light generator 110 to spatial light modulator 120-1 is referred to homogenous light portion 118A-1, and light that directed from homogenous light generator 110 to spatial light modulator 120-2 is referred to homogenous light portion 118A-2. As set forth in additional detail below, homogenous light generator 110 is implemented using any of several technologies, and is therefore depicted in a generalized form here.

Referring to the center left portions of FIG. 1, spatial light modulators 120-1 and 120-2 are disposed in homogenous light field 119A, and serve the purpose of modulating portions of homogenous light 118A accordance with modified image data groups IDB-1 and IDB-2. As indicated in FIG. 1, spatial light modulator 120-1 receives homogenous light portion 118A-1 from homogeneous light generator 110, and selectively passes modulated light portion 118B-1 to anamorphic optical system 130-1. Similarly, spatial light modulator 120-2 receives homogenous light portion 118A-2 from homogeneous light generator 110, and selectively passes modulated light portion 118B-2 to anamorphic optical system 130-2.

Spatial light modulators 120-1 and 120-2 are implemented using commercially available devices including a digital micro mirror device (DMD), such as a digital light processing (DLP®) chip available from Texas Instruments of Dallas Tex., USA, an electro-optic diffractive modulator array such as the Linear Array Liquid Crystal Modulator available from Boulder Nonlinear Systems of Lafayette, Colo., USA, or an array of thermo-optic absorber elements such as Vanadium dioxide reflective or absorbing mirror elements. Other spatial light modulator technologies may also be used. While any of a variety of spatial light modulators may be suitable for a particular application, many print/scanning applications today require a resolution 1200 dpi and above, with high image contrast ratios over 10:1, small pixel size, and high speed line addressing over 25 kHz. Based on these specifications, the currently preferred spatial light modulator is the DLP® chip due to its best overall performance.

Referring to the right side of FIG. 1, according to a specific embodiment of the present invention, apparatus 100 is a printer or scanner in which a member defining an imaging surface 160 such as an imaging drum cylinder is coated with a fountain solution that is evaporated on the imaging surface heated by anamorphically imaged and concentrated modulated light fields 119C-1 and 119C-2, which are defined by the collection of anamorphically imaged and concentrated modulated light portions 118C-1 and 118C-2 imaged and concentrated by anamorphic optical systems 130-1 and 130-2, respectively.

Referring again to FIG. 1, according to an aspect of the present invention, at least one of spatial light modulators 120-1 and 120-2 and corresponding anamorphic optical systems 130-1 and 130-2 are purposefully arranged to produce an overlapping pattern in imaging region 167 of imaging member 160. That is, the components are arranged such that, if all of the modulating elements in spatial light modulators 120-1 and 120-2 were turned "on", the resulting scan line portions SL-1 and SL-2 would overlap in region W. In particular, with all modulating elements of adjacent spatial light modulators 120-1 and 120-2 turned "on", the lowermost edge of anamorphically imaged and concentrated light field 119C-1 overlaps the uppermost end of anamorphically imaged and concentrated light field 119C-2, whereby sections of scan line portions SL-1 and SL-2 are simultaneously generated in overlap region W of imaging region 167. This overlapping component arrangement ensures that imaging apparatus 100 is able to produce the scan line SL without gaps that can be caused when the adjacent anamorphic optical systems 130-1 and 130-2 are placed too far apart during assembly. Anamorphic optical systems (130-1 and 130-2) serves to anamorphically image and concentrate (focus) the modulated light portions, which are received from spatial light modulators (120-1 and 120-2) by way of two-dimensional light fields 119B, onto an associated portion of imaging region 167 such that elongated scan line portion SL-1 is generated having a width S1 and SL-2 having width S2 whereby the received light portions are anamorphically focused to form an elongated scan line image portion SL-1 and SL-2 that extends parallel to an arbitrary direction.

The brightness (or darkness) of a "spot" formed on each imaging region SL-1 and SL-2 is controlled by the number of light modulating elements that are turned "on" in each associated column and darkness on the column of array that are turned "off", whereby image regions SL-1 and SL-2 may include "black" spots. Light modulating elements have ON or OFF states and such a stated can be associated with a particular pixel. One key to this invention lies in understanding the light portions passed by each light modulating element represent one pixel of binary data that is delivered to the scan line by anamorphic optical system 130, so that brightness of each imaging pixel of the scan line is determined by the number of light portions (binary data bits) that are directed onto the corresponding imaging region. In order to form a complete image on the imaging member 160 the imaging regions (SL-1, SL-2, SL-3 . . . SL-n) are stitched together.

FIG. 2 is a representation showing the cross-process positioning of the DMDs to form a stitched image on a printing plate in accordance to an embodiment. FIG. 2 clearly shows the association of mirror location to a corresponding pixel location on the imaging member 160.

FIG. 2 shows a representation of the imaging module consisting of 3 DMDs. Each DMD has a laser beam (light source 110 in FIG. 1) that projects on to an array of mirrors, which in turn, reflect the laser light onto an image forming device. Wherever the laser light hits, a mark will be made on the media such as imaging member 160. Each mirror can be turned to allow the laser to either hit ("ON") the image forming device or not ("OFF"). Resolution of the mirrors is 1200 dots per inch, in the cross process direction, i.e., along SL-1 . . . SL-3 as shown. Process direction resolution is based on the rotational speed of the image forming device because it affects the duration of the amount of exposure incident on the surface.

In FIG. 2, if we look at DMD 1 (beam 1 that corresponds to SL-1 at imaging member 160) we can see that the numbering of the mirrors, from left to right are 1279 to 0, DMD 2 is numbered 0-1279 and DMD 3 is numbered 1279-0. This is because the physical packaging of the DMD's requires that alternating DMD's are placed upside-down (due to space constraints) It also shows that for DMD 1, Mirrors 1171 through Mirror 110 are used for imaging, resulting in a printable width coming from DMD 1 of 1062 pixels (1200 DPI pixels). DMD's 2 and 3 are also shown (in this example) as having printable widths of 1062 pixels each (although each of the DMDs has 1280 mirrors, the irradiance of the laser at the image forming surface drops off as you get closer to the ends, so only the mirrors in the middle are useable).

The table below shows how the mirrors from the configuration shown in FIG. 2, relate to the image pixel locations that will show up on the imaging member like a print media.

TABLE 1

Relationship of DMD, Mirror Location, and Pixel Location

|  | Mirror Column | Image Pixel | DMD Print Width |
|---|---|---|---|
| DMD 1 - First Pixel | 1171 | 1 | 1062 |
| DMD 1 - Last Pixel | 110 | 1062 |  |
| DMD 2 - First Pixel | 111 | 1063 | 1062 |
| DMD 2 - Last Pixel | 1172 | 2124 |  |
| DMD 3 - First Pixel | 1171 | 2125 | 1062 |
| DMD 3 - Last Pixel | 110 | 3186 |  |

The number of usable mirrors across different DMD's is different, depending on the optical properties of each particular DMD, as is the cross-process location of usable DMDs. For example, one DMD may have an irradiance profile such that mirrors 100 through 1200 are usable, whereas another may have only mirrors 120 through 1100 be usable.

The DMD's are aligned physically, in manufacturing, so that the low mirror of DMD1 is aligned as closely as possible to the low mirror of DMD 2, and the high mirror of DMD 2 is aligned as closely as possible to the high mirror of DMD 3. However, because of thermal changes, shifts of the DMDs during installation, and degradation over time, this alignment coming out of manufacturing may not provide sufficient image quality after installation into a machine. For these reasons the use of DMDs makes the printing elements into non-discrete image generating mechanisms and a new way to calibrate or compensate is needed. An ad-hoc mapping of DMD mirror to pixels on the imaging member meet a long felt need in the art of printing such as in Digital Lithography and Direct Laser Microfusion (DLM) printing.

Therefore, the alignment between DMD's must be measured, in situ, both after installation, and periodically during use. If it turns out that the alignment between DMDs has changed over time, then, in the cross-process direction, they can be brought back into cross-process direction alignment by selecting a different set of mirrors for a given DMD. For example, if the cross-process direction stitch error between DMD 1 and DMD 2 is such that there was a gap of 1, 1200-DPI pixel, then the mirrors used on DMD 1 could be changed from say, (1171 through 110) to (1170 through 109) because one may move the adjustable positions of the stitch that forms the image on a media. Note that we only have 1 pixel resolution in the adjustment of the cross-process position, so any finer tuning of the image position has to be performed by other means.

Figure 4:
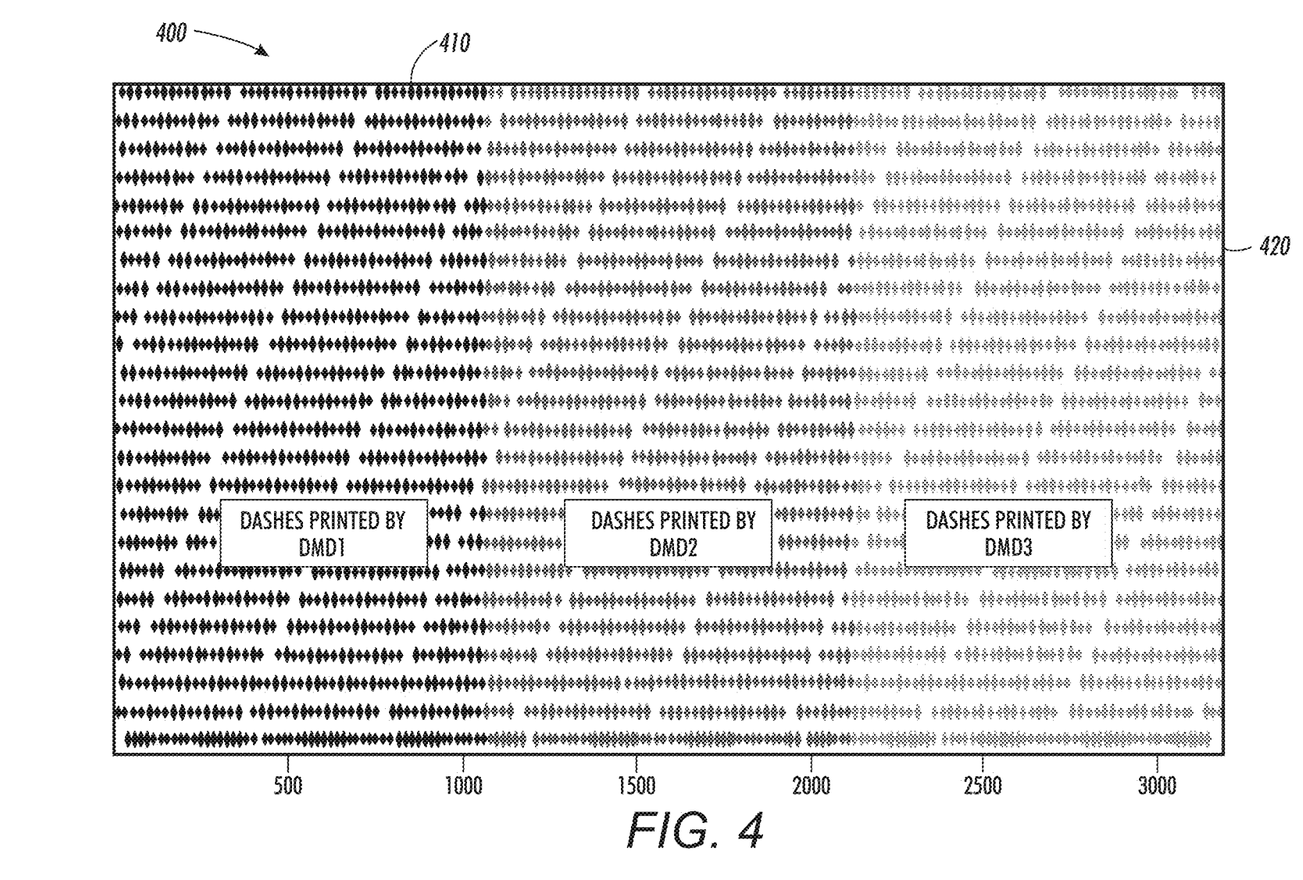
FIG. 4 shows a stitch Test Pattern with Different dashes printed by different DMDs in accordance to an embodiment.
Figure 6:
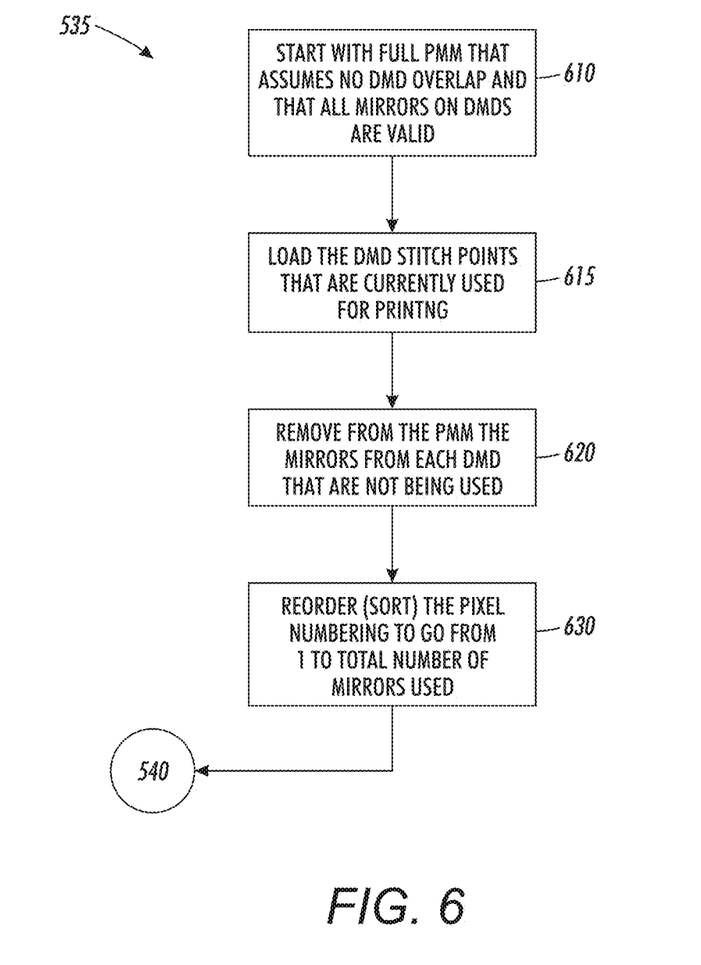
FIG. 6 is a method to modify a Pixel-to-Mirror Map (PMM) table that indicates to an analyzer which dash is printed by which mirror of a DMD in accordance to and embodiment.
Figure 7:
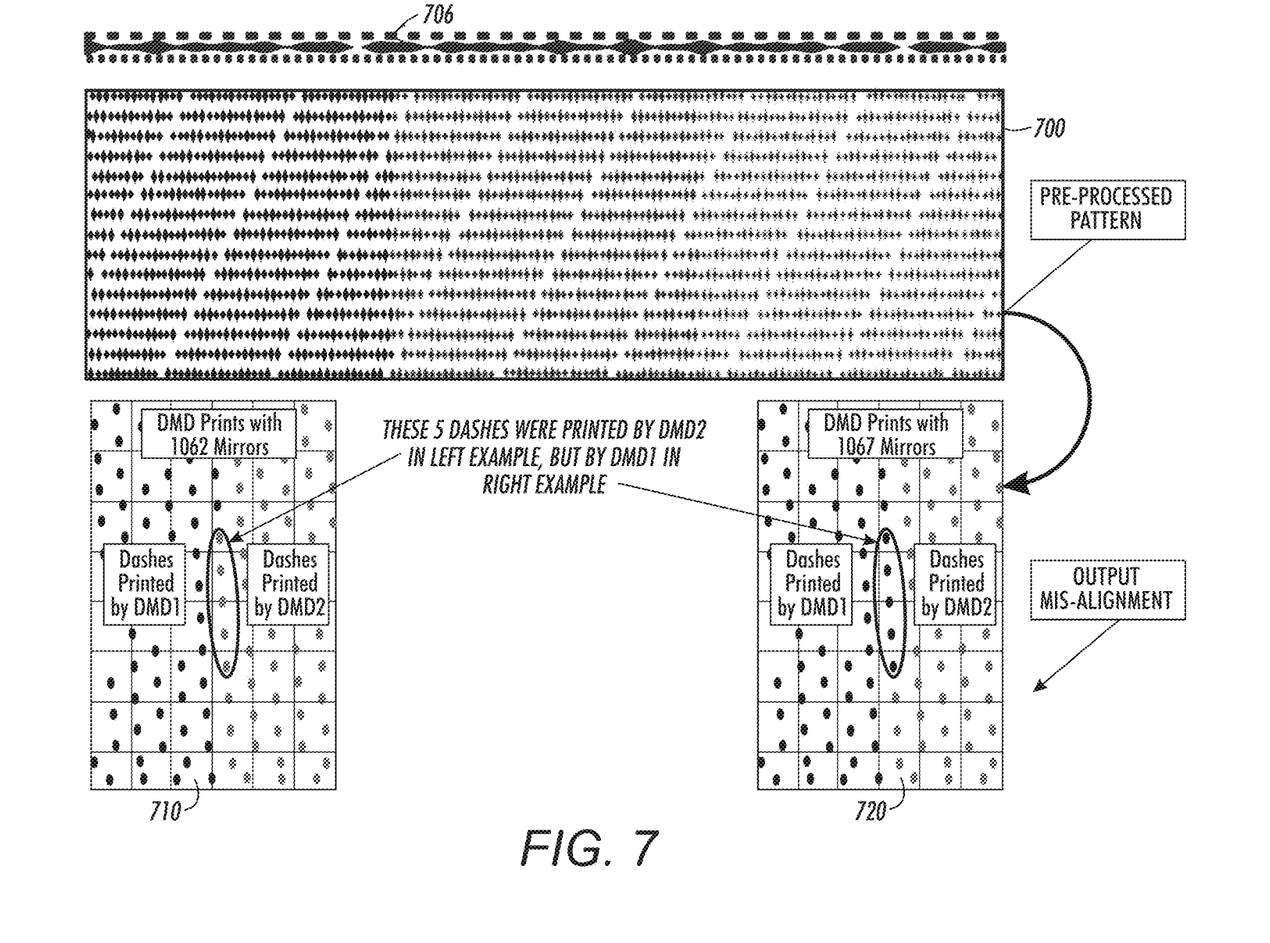
FIG. 7 is a view of a test pattern image and output of a test pattern illustrating how adjustments can be made by changing the number of mirrors used by a DMD to correct misalignment errors in accordance to an embodiment.

FIG. 7 is a view of a test pattern image 700 and output of a test pattern illustrating how adjustments can be made by changing the number of mirrors used by a DMD to correct misalignment errors in accordance to an embodiment. FIG. 7 illustrates how misalignment can be ascertained by a printing and scanning of the test pattern; and, then forwarding the scanned test pattern to an Image Based Controller (IBC) having instructions such as an analysis package. Start by generating one stitch test pattern that will be used regardless of DMD stitch points as opposed of regenerating a different test pattern based on the current First and Last mirror settings (a.k.a. stitch points) for every DMD. Trigger Strips 705 are used to identify the test pattern 700 to the Image Based Control system so as to trigger the scan and analysis process like described in FIG. 5 and FIG. 6. Dashes like shown in FIG. 4 are created by individual mirrors on each DMD. All useable mirrors are represented. Zoom in on the transition area between DMD1 and DMD2 (710 or 720), and look at two examples of different number of mirrors used on DMD1 (FIG. 7). The example on the left of FIG. 7 (710) shows the dash/DMD assignment if DMD1 is printing with 1062 Mirrors, and the example on the right of FIG. 7 (720) shows the dash/DMD assignment if DMD1 is printing with 1067 mirrors. As can be seen mirrors (1063 . . . 1067) at 720 causes a misalignment that can be corrected by turning "OFF" those mirrors in DMD1. Output 710 shows the correction of the misalignment shown in 720.

Next, an embodiment of the present invention will be described. Note that portions which are the same as those in the first embodiment (FIGS. 1, 2, and 7) described above are denoted by the same reference numerals, and descriptions of the same portions as those as in the first embodiment will be omitted.

Figure 3:
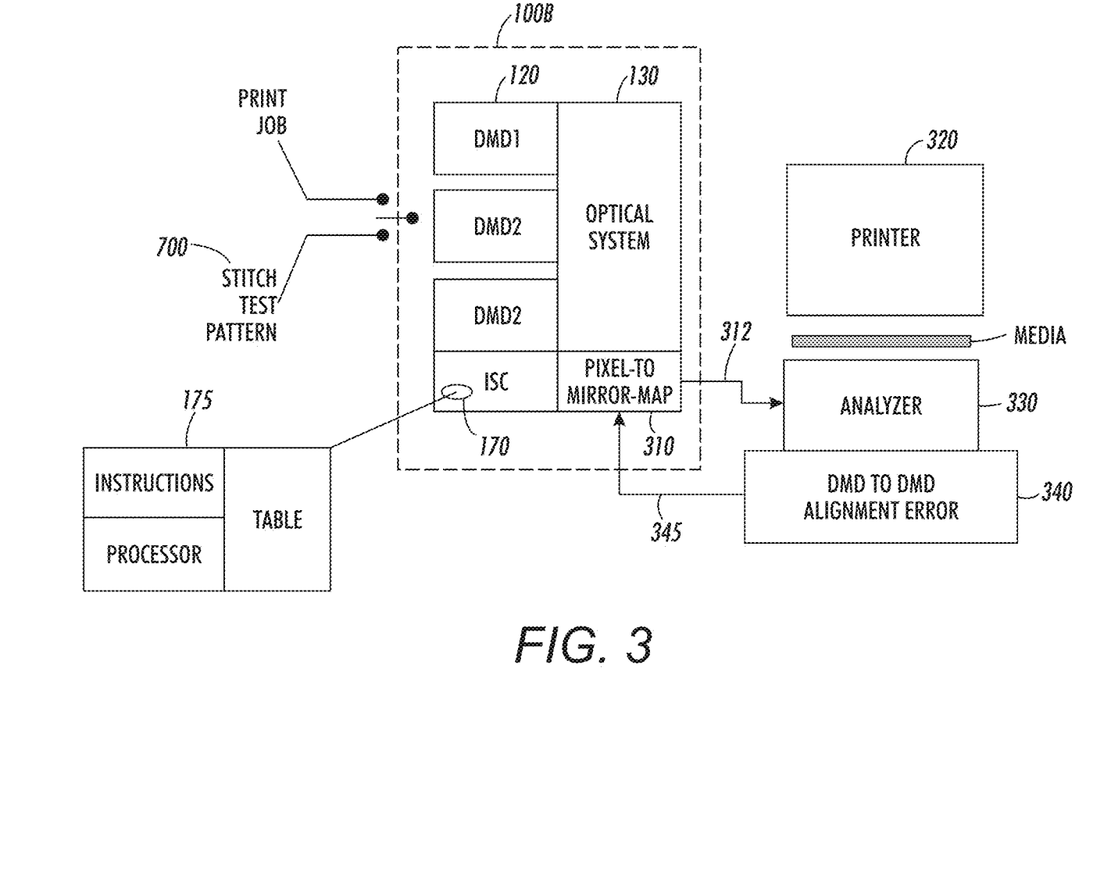
FIG. 3 is a block diagram of an imaging apparatus and analyzer to determine DMD alignment errors with feedback path to correct for such errors in accordance to an embodiment.

FIG. 3 is a block diagram of an imaging apparatus and analyzer 300 to determine DMD alignment errors with feedback path to correct for such errors in accordance to an embodiment.

A print job or stitch test pattern 700 is processed by the electrical components 100B of imaging apparatus 100 in the manner described with reference to the apparatus of FIG. 1. The electrical components comprise light modulators (DMD1 . . . DMD3), anamorphic optical system 130, a pixel-to-mirror-map table 310 which can be a standalone discrete component such as an eeprom/ram or form an integral part of image stitching controller 170. The controller 170 comprises at a minimum instructions, processor, table, or storage device for maintaining and serving the instructions that when compiled by the processor causes the controller to perform the functions of apparatus 100 and the actions necessary to analyze the rendered stitch image. After processing of an image such as a stitch pattern 700 the output is then forwarded to printer 320 for rendering. In printer 320 an image is formed on the imaging member 160 by the evaporation of a liquid solution and then transferred to a print media by the application of ink from print heads or rollers (not shown) which is well known to those in the art of digital lithography. In the case of digital lithography the imaging member 160 then further rotates to a 'development' station (not shown) where lithographic-like ink is brought into contact with a fountain solution based 'latent image' and ink 'develops' onto the places where optical energy has removed the fountain solution. The imaging member 160 then rotates to a transfer station (not shown) where the ink is transferred to a print media such as paper.

The pixel-to-mirror-map table 310 is a tabular form of the association between the DMD, the mirror, and the pixels. Table 1, above, would be the generalized form of the table because it doesn't point to a specific pixel being assigned/mapped to a specific mirror of a DMD. The pixel-to-mirror-map table takes the following form:

| Pixel | Color | DMD Beam | Print Status | DMD Mirror |
|---|---|---|---|---|
| Num | Num, String | Num | Binary | Num |

Where pixel is a numerical value based on the number of DMDs and the number of mirrors being used. For example, in a single DMD with 1280 mirror, then number of pixels would be from 1↔1280; while three mirrors would be from 1↔3840. Color could be the numerical form of a color or the name of the color. The color information would be important when analyzing the rendered stitch pattern. The DMD Beam is the numerical form of DMD1, DMD2, etcetera. The print status is an indication of "ON" or "OFF" for a particular mirror. The DMD mirror is the number assigned to that particular mirror of the DMD.

The media is processed by analyzer 330 where DMD to DMD alignment errors 340 are obtained and then feedback 345 to ISC 170 where it is used to change the pixel-to-mirror-map table 310 or the stitch assignment. The analyzer 330 performs a scanline analysis of the media to determine if misalignments exist between the DMDs. FIG. 4 shows a stitch Test Pattern with Different dashes printed 400 by different DMDs in accordance to an embodiment. To clarify further, FIG. 4 shows an example of the stitch test pattern with different color objects to denote which dashes are printed by which DMD. The test pattern 700 includes a series of rows 420 and columns 410 of dashes, where each dash was formed by a single DMD in the print zone 400. Using reflectance values the analyzer 330 is able to identify the DMDs and individual mirrors that printed each dash. The analyzer 330 is able to determine when the DMDs are misaligned and when some dashes are missing from the rendered test pattern. Missing dashes are indication of faulty or inoperable mirrors. Misalignment between the DMDs can be identified from having dashes printed outside the print zone 400 and when more dashes in a row are printed than it was expected indication multiple DMDs printing the same dash. Misalignment can be further calculated by using the distances between dashes and when the distance is greater than an expected value it would be an indication of misalignment between the DMDs.

Figure 5:
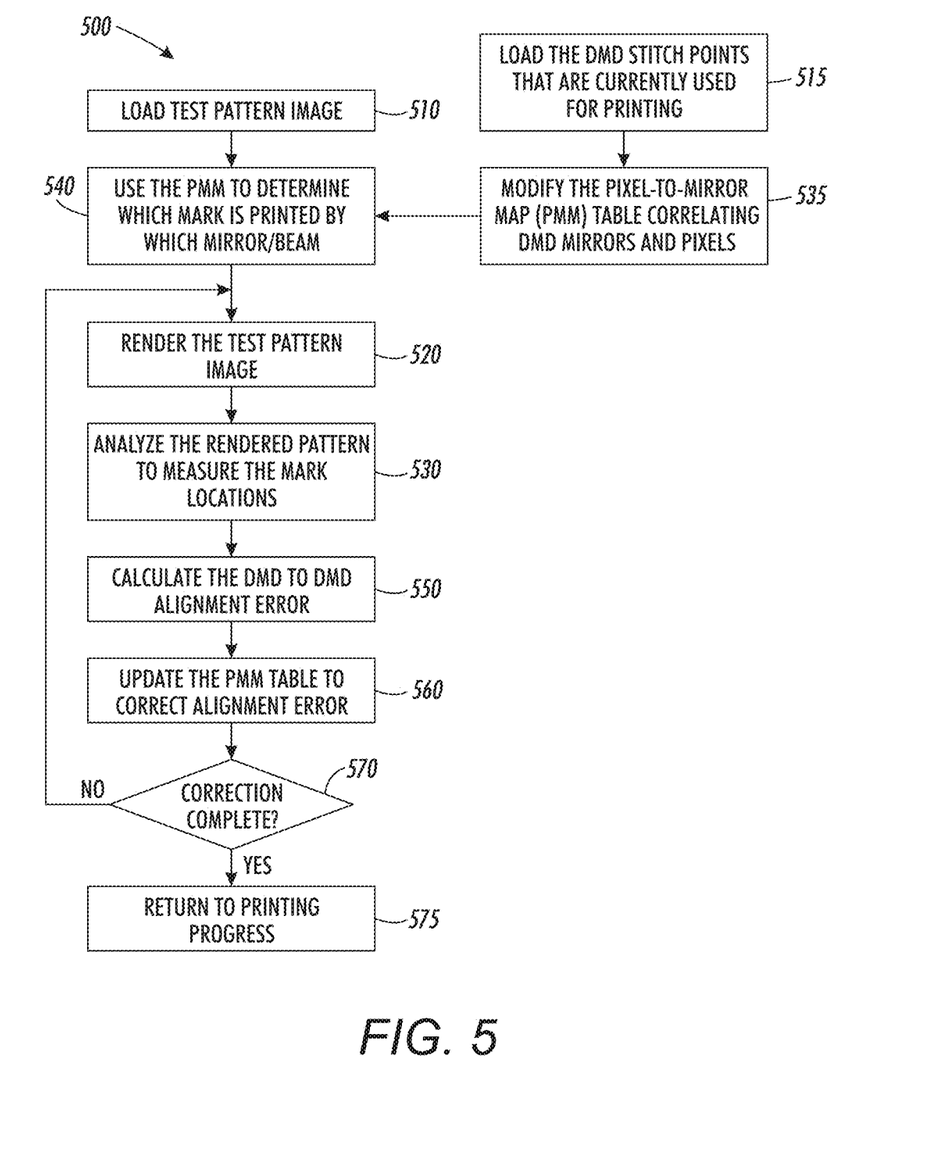
FIG. 5 is a flowchart of a method to register printing elements which render a variable number of pixels in accordance to an embodiment.

FIG. 5 is a flowchart of a method 500 to register printing elements which render a variable number of pixels in accordance to an embodiment.

Method 500 is shown as a series of interconnected processes to register printing elements useful in a printing environment. Interconnection between the processes represents the exchange of information between the processes. Once the flow is modelled, each process may be implemented in a conventional manner. Each process may, for example, be programmed using a higher level language like Java, C++, Python, Perl, or the like, or may be performed using existing applications having a defined interface. For example, the function of certain processes may be provided by remote web servers using conventional web interfaces like CGI scripts or the like. As well, flow programming allows individual process to execute on different hardware and software platforms that may physically remote from each other. Upon execution, a run-time environment (including run-time code) acts as a flow engine and ensures co-operation between processes in accordance with the flow model. The run-time code typically looks after process execution; inter-process communication; errors; system crashes and the like. Conveniently, programmers and architects need not be concerned about these details as they are handled by run time code.

Method 500 begins with the loading of the test pattern image at action 510. Test pattern image is shown at 700 in FIG. 7. Method 500 begins with action 510 by loading the test pattern image 700 for printing. Concurrently, simultaneously or thereafter with action 510 action 515 loads the DMD stitch points that are currently used for processing a print job. The stitch points are marshaled into a table that associates the mirror sequence for each DMD and associated pixels for the mirror sequence. A stitch point table takes the following form:

|  | Mirror Column |
|---|---|
| DMD 1 - First Pixel | 1175 |
| DMD 1 - Last Pixel | 114 |
| DMD 2 - First Pixel | 111 |
| DMD 2 - Last Pixel | 1172 |
| DMD 3 - First Pixel | 1160 |
| DMD 3 - Last Pixel | 110 |

The stitch points (table) is then forwarded to action 535 where it is used to modify the pixel-to-mirror map (PMM) table which correlates the DMD mirrors to the pixels to be rendered on the imaging member 160. In action 540, the PMM table as modified is used to determine the mirror/beam that is being used to render the mark on imaging member 160. Control is the passed to action 520 where the test pattern image is rendered on the imaging member 160. In action 530 the rendered pattern is analyzed to acquire metrics such as mark locations so a determination can be made as to DMD alignment errors in action 550. The metrics generally take the form of inter DMD errors and intra DMD errors. Possible techniques for metric determination are measuring skews in the rendered marks along a column or row, counting of marks to determine additional marks or missing marks, distances between marks, and misplaced or misapplied marks that are associated with another DMD. All these metrics can indicate that DMD alignment errors are present and because of the use of mirrors to form the image is the same as determining stitching errors. In action 560, the PMM table or the stitch point table are updated with corrections. The correction can take the form of reassigning pixels to another DMD, not activating a set of mirrors, reducing the number of mirrors used to render the image. For example, like shown in FIG. 7, a misalignment 720 was corrected by reducing the number of mirrors used at DMD1. Control is then passed to action 570 where a determination is made as to completion of the corrections. If corrections are completed then the process through action 575 is returned to the normal printing process. If, however, if not all corrections have been made or if a robust calibration requirement is in place then control is returned to action 520 where the test pattern image is rendered using the updated PMM table of action 560. The actions of 520, 530, 550, and 560 can be continued until a satisfactory alignment error is determined.

FIG. 6 is a method 535 to modify a Pixel-to-Mirror Map (PMM) table that indicates to an analyzer which dash is printed by which mirror of a DMD in accordance to and embodiment. Method 535 begins with action 610 where a PMM table is created comprising a storage structure containing pixel identification, micro mirror identification for each micro mirror of a DMD associated with the identified pixel, and parallel light beam state associated with the identified pixel; wherein the parallel light beam state is ON or OFF. Control is used to load the stitch point table of action 515 of method 500. The stitch point table of action 515 is used in action 620 to modify or augment the PMM table of action 610 so that mirrors not being used are not represented in the PMM table. The modified PMM table as created by action 620 is then sorted or reorder in action 630 so that the pixel numbering start at pixel 1 to the total number of mirrors used. The pixel number is used as an index of the PMM table for reading the assigned mirror being used to render the image on imaging member 160.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of registering printing elements in an image formation apparatus to render an image from a variable number of pixels, the method comprising:
    loading instructions to a processor for stitching parallel light beams from the printing elements into a single image that can be formed as a series of marks on an imaging member;
    wherein the parallel light beams are directed by at least two digital micro mirror devices (DMDs) each comprising a plurality of mirrors such that the parallel light beams are reflected out onto the imaging member;
    loading at the processor a test pattern image to be rendered as the series of marks on the imaging member;
    using a table that has been modified based on the loaded instructions to determine which of the plurality of mirrors is to produce the series of marks;
    using the table to render the test pattern image on the imaging member;
    analyzing the rendered image to determine if a stitch error will occur;
    when a stitch error is determined, then correcting the stitch error by modifying at least one of the table and the processor;
    wherein modifying the processor is modifying the loaded instructions.

2. The method according to claim 1, wherein the table comprises a storage structure containing pixel identification, micro mirror identification for each micro mirror of a DMD associated with the identified pixel, and parallel light beam state associated with the identified pixel; wherein the parallel light beam state is ON or OFF.

3. The method according to claim 2, wherein the table is modified by:
    using the loaded instructions to determine parallel beam state for all micro mirrors of the DMDs; and
    populating the table with the determined parallel beam state for all micro mirrors of the DMDs.

4. The method according to claim 3, wherein the table is modified by:
    removing from the table all micro mirror entries associated with a determined parallel beam state of OFF.

5. The method according to claim 4, wherein the table is modified by:
    reordering the pixel identification to go from 1 to N, where N is the number of micro mirrors being used.

6. The method according to claim 3, the method further comprising:
    identifying in image data of the imaging member an area in which the test pattern has been rendered, the test pattern having dashes formed with different colors denoting dashes printed by different DMDs;
    identifying a center of each dash in a cross-process direction;
    identifying from the table a DMD that formed each dash in the test pattern;
    identifying a DMD expected to form a dash in the test pattern that failed to form the dash;
    modifying the table or the instructions to the processor to change the micro mirrors used for the DMD that failed to form the dash.

7. The method according to claim 6, wherein the processor comprises a CPU (Central Processing Unit) of a data-processing apparatus.

8. The method according to claim 6, wherein the processor communicates electronically with the at least two digital micro mirror devices.

9. The method according to claim 3, wherein modifying the table or to the processor is re-assigning at least one micro mirror of the DMDs to produce the series of marks on the imaging member.

10. A non-transitory computer-readable medium having stored thereon computer executable instructions that, when executed on a processing device, cause the processing device to perform the method of claim 1.

11. The non-transitory computer-readable medium storing computer-readable instructions according to claim 10, wherein the table comprises a storage structure containing pixel identification, micro mirror identification for each micro mirror of a DMD associated with the identified pixel, and parallel light beam state associated with the identified pixel; wherein the parallel light beam state is ON or OFF;
    wherein the table is modified by the processing device by:
    using the loaded instructions to determine parallel beam state for all micro mirrors of the DMDs; and populating the table with the determined parallel beam state for all micro mirrors of the DMDs;
wherein the table is modified by the processing device by:
removing from the table all micro mirror entries associated with a determined parallel beam state of OFF;
wherein the table is modified by the processing device by:
reordering the pixel identification to go from 1 to N, where N is the number of micro mirrors being used.

12. An image formation apparatus, comprising:
a member defining an imaging surface;
at least two digital micro mirror devices (DMDs), each disposed over a surface of the member defining an imaging surface at different angular positions, so as to project a beam onto the surface from different angles;
a processor; and
a storage device coupled to the processor, wherein the storage device contains instructions operative on the processor to register projected variable number of pixels from the DMDs by:
loading instructions for stitching parallel light beams from the DMDs into a single image that can be formed as a series of marks on an imaging member;
wherein the parallel light beams are directed by the at least two digital micro mirror devices (DMDs) each comprising a plurality of mirrors such that the parallel light beams are reflected out onto the imaging member;
loading a test pattern image to be rendered as the series of marks on the imaging member;
using a table that has been modified based on the loaded instructions to determine which of the plurality of mirrors is to produce the series of marks;
using the table to render the test pattern image on the imaging member;
analyzing the rendered image to determine if a stitch error will occur;
when a stitch error is determined, then correcting the stitch error by modifying at least one of the table and the processor;
wherein modifying the processor is modifying the loaded instructions.

13. The image formation apparatus according to claim 12, wherein the table comprises a storage structure containing pixel identification, micro mirror identification for each micro mirror of a DMD associated with the identified pixel, and parallel light beam state associated with the identified pixel; wherein the parallel light beam state is ON or OFF.

14. The image formation apparatus according to claim 13, wherein the table is modified by the processor by:
using the loaded instructions to determine parallel beam state for all micro mirrors of the DMDs; and
populating the table with the determined parallel beam state for all micro mirrors of the DMDs.

15. The image formation apparatus according to claim 14, the processor further performing:
identifying in image data of the imaging member an area in which the test pattern has been rendered, the test pattern having dashes formed with different colors denoting dashes printed by different DMDs;
identifying a center of each dash in a cross-process direction;
identifying from the table a DMD that formed each dash in the test pattern;
identifying a DMD expected to form a dash in the test pattern that failed to form the dash;
modifying the table or the instructions to the processor to change the micro mirrors used for the DMD that failed to form the dash.

16. The image formation apparatus according to claim 15, wherein the processor comprises a CPU (Central Processing Unit) of a data-processing apparatus and wherein the member defining an imaging surface is a rotatable drum.

17. The image formation apparatus according to claim 15, wherein the processor communicates electronically with the at least two digital micro mirror devices.

18. The image formation apparatus according to claim 14, wherein the table is modified by the processor by:
removing from the table all micro mirror entries associated with a determined parallel beam state of OFF.

19. The image formation apparatus according to claim 18, wherein the table is modified by the processor by:
reordering the pixel identification to go from 1 to N, where N is the number of micro mirrors being used.

20. The image formation apparatus according to claim 14, wherein modifying the table or to the processor is re-assigning at least one micro mirror of the DMDs to produce the series of marks on the imaging member.

* * * * *